United States Patent
Andersson et al.

(10) Patent No.: US 9,469,172 B2
(45) Date of Patent: Oct. 18, 2016

(54) INDEPENDENT REAR SUSPENSION WITH LIFTING DEVICE

(71) Applicant: VOLVO TRUCK CORPORATION, Göteborg (SE)

(72) Inventors: Jörgen Andersson, Landvetter (SE); Johan Samson, Torslanda (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 14/440,919

(22) PCT Filed: Nov. 7, 2012

(86) PCT No.: PCT/SE2012/000181
§ 371 (c)(1),
(2) Date: May 6, 2015

(87) PCT Pub. No.: WO2014/074031
PCT Pub. Date: May 15, 2014

(65) Prior Publication Data
US 2015/0298518 A1    Oct. 22, 2015

(51) Int. Cl.
*B60G 3/20* (2006.01)
*B60G 11/27* (2006.01)
*B62D 21/11* (2006.01)
*B62D 61/12* (2006.01)
*B60G 11/28* (2006.01)

(52) U.S. Cl.
CPC .................. *B60G 3/20* (2013.01); *B60G 11/27* (2013.01); *B60G 11/28* (2013.01); *B62D 21/11* (2013.01);
(Continued)

(58) Field of Classification Search
CPC .. B60G 3/20; B60G 11/27; B60G 2202/152; B60G 2204/126; B60G 2204/143; B60G 2204/148; B60G 2204/15; B60G 2204/4702; B60G 2200/144; B60G 2300/026; B60G 2300/402; B62D 21/11; B62D 61/12
See application file for complete search history.

(56) References Cited

U.S. PATENT DOCUMENTS 3,477,738 A * 11/1969 Manning .............. B62D 61/125
    180/22
6,796,566 B2 * 9/2004 VanDenberg ............ B60G 7/02
    280/124.128
(Continued)

FOREIGN PATENT DOCUMENTS

DE    102006032884 A1    1/2008

OTHER PUBLICATIONS

International Search Report (Jul. 5, 2013) for corresponding International App. PCT/SE2012/000181.
(Continued)

*Primary Examiner* — Laura Freedman
(74) *Attorney, Agent, or Firm* — WRB-IP LLP

(57) ABSTRACT

An independent suspension and an independent suspension arrangement for a liftable rear axle of a heavy vehicle are provided. The independent suspension includes a lower wishbone and an upper wishbone hingedly suspended in a support assembly and a hub carrier, and an air bellows and a lifting bellows, where the air bellows is arranged outside of a plane defined by the web of a main frame beam and the lifting bellows is arranged inside of a plane defined by the web of a main frame beam. The independent suspension arrangement includes a left wheel suspension, a right wheel suspension and at least one sub-frame assembly extending between the left and right wheel suspensions, where the left and right wheel suspensions are mounted directly to the sub-frame assembly.

15 Claims, 3 Drawing Sheets

(52) U.S. Cl.
CPC ......... *B62D 61/12* (2013.01); *B60G 2200/144* (2013.01); *B60G 2202/152* (2013.01); *B60G 2204/126* (2013.01); *B60G 2204/143* (2013.01); *B60G 2204/148* (2013.01); *B60G 2204/15* (2013.01); *B60G 2204/4702* (2013.01); *B60G 2206/60* (2013.01); *B60G 2300/026* (2013.01); *B60G 2300/402* (2013.01)

(56) References Cited

U.S. PATENT DOCUMENTS

| | | | | |
|---|---|---|---|---|
| 6,957,819 | B2* | 10/2005 | Chalin | B60G 9/00 280/124.116 |
| 7,434,821 | B2* | 10/2008 | Hinz | B60G 7/001 280/124.116 |
| 8,522,933 | B2* | 9/2013 | Chalin | B60G 9/00 188/266 |
| 8,967,639 | B2* | 3/2015 | Conaway | B60G 5/04 280/124.128 |
| 2002/0093169 | A1 | 7/2002 | Peterson | |
| 2005/0151337 | A1 | 7/2005 | Chalin et al. | |

OTHER PUBLICATIONS

International Preliminary Report on Patentability (Dec. 2, 2015) for corresponding International App. PCT/SE2012/000181.
European Search Report dated (Aug. 31, 2016) for corresponding European App. EP12887934.

* cited by examiner

INDEPENDENT REAR SUSPENSION WITH LIFTING DEVICE

BACKGROUND AND SUMMARY

The present invention relates to an individual rear suspension having a lifting device for a vehicle. The individual rear suspension is especially suitable to be used in a rear suspension arrangement having a pusher function.

Heavy vehicles are normally provided with front wheels suspended on a rigid front axle and steering knuckles. The front axle is an integral unit often made of heat treated, drop-forged special steel. The rear wheels are normally also suspended with a rigid rear axle. For a driven rear axle, a rear axle housing is used both for suspending the wheels and for the transmission of power from the drive train to the wheels, where the rear axle housing is provided with a differential and drive shafts.

Heavy vehicles are often provided with more than one rear axle. Depending on the intended use, the additional rear axles may be either driven or trailing and they may be fixed or steerable. When more than one axle is used, they are often arranged in a bogie configuration.

The purpose of the rear suspension is to absorb the forces that arise when the driving three of the wheels is transferred to the road surface. At the same time, it must also support the major part of the total weight of the vehicle. A vehicle can be equipped with a single rear axle, or with a bogie consisting of or comprising two or three rear axles. The bogie can he composed of two driving rear axles (6×4) or with one driving rear axle and a trailing, wheel axle (6×2). Bogie combinations with two trailing wheel axles, one in from and one behind the driving wheel axle, also appear. Some trailing wheel axles can be raised and lowered with the aid of a bogie lift.

A trailing axle is used strictly for load-bearing purposes and can be raised when it is not required. A trailing axle located immediately in front of a drive axle is called a pusher axle and a trailing axle situated behind a drive axle is called a tag axle. When a trailing axle is not used, e.g. when the vehicle is empty, it can be raised in order to improve the drivability of the vehicle and to reduce wear on the axle and its components. Designing a lifting tag axle having a rigid axle is relatively easy, since the tag axle will not interfere with the propeller shaft of the vehicle.

Often, a pusher axel consists of r comprises a front axle with steering knuckles installed in front of the driving rear axle. This type of bogie appears in two different models, one with a steerable pusher axle and one with a locked pusher axle. In the model with the steerable pusher axle, the steering knuckles are connected to the front axle steering function. For the locked pusher axle, the steering knuckles are fixed in one position. One problem with raising a pusher axle is that the axle will interfere with the propeller shaft. The front axle normally extends downwards, such that there is room for the propeller shaft when the pusher axle is raised. This solution however reduces the ground clearance of the vehicle, since the axle must be positioned below the propeller shaft.

There is thus room for an improved individual rear suspension arrangement.

It is desirable to provide an improved individual suspension for a liftable rear axle. It is also desirable to provide an improved rear suspension arrangement for a liftable rear axle with a reduced extension in a longitudinal direction. It is also desirable to provide an improved rear suspension arrangement which reduces stress imposed on the main frame of the vehicle. It is also desirable to provide an improved rear suspension arrangement having an improved ground clearance. It is also desirable to provide a method for mounting the improved rear suspension arrangement to the vehicle.

The solution to the problem according to the invention is described in the characterizing part of claim 1 with regards to the individual rear suspension, in the characterizing part of claim 7 with regards to the individual rear suspension arrangement, in claim 14 with regards to the vehicle and in claim 17 with regards to the method. The other claims contain advantageous further developments of the inventive rear suspension and the method.

In an individual suspension for a rear axle of a vehicle, comprising a lower wishbone bracket and an upper wishbone bracket, where the lower wishbone bracket and the upper wishbone bracket are hingedly suspended to a support assembly and to a kingpost, the suspension further comprises an air bellows and a lifting bellows.

By this first embodiment of the individual suspension according to the invention, an individual suspension for a liftable rear axle is provided which have a reduced extension in the longitudinal direction of the suspension. The air bellows and the lifting bellows are arranged sideways to each other, along the centre line of the imaginary wheel axle of the suspension. In this way, the suspension arrangement does not extend forwards or rearwards of the wheel, which e.g. allows for the use of a larger fuel tank. The suspension is hingedly suspended in a support assembly which is preferably attached to a frame bracket and not directly to the main frame of the vehicle. Preferably, the air bellows and the lifting bellows are also supported by the same frame bracket.

The actual suspension of a wheel is obtained by the use of two wishbone brackets, an air bellows and a king post which holds and supports the wheel. Both wishbone brackets are hingedly suspended in the support assembly and in the king post. The support assembly, which may be a sub-frame assembly, is preferably fixedly mounted to a single frame bracket, which means that the support assembly is fixed when the wheel springs. With all load carrying components of the suspension mounted to the same flame bracket, and with the frame bracket mounted to the web of the main frame beam in only one mounting position, no loads acting on the wheel suspension will be transferred to the main frame beam but will be absorbed and diverted by the frame bracket.

The air bellows is positioned outside the vehicle frame, outside of a plane defined by the web of the main frame beam. The lifting bellows is positioned inside the vehicle frame, inside of a plane defined by the web of the main frame beam. In this way, both the air bellows and the lifting bellows are well protected and the longitudinal extension of the wheel suspensions is reduced compared to commonly known lifting arrangements.

In an individual suspension arrangement for a liftable rear axle of a vehicle, comprising a left wheel suspension and a right wheel suspension, the arrangement further comprises at least one sub-frame assembly extending between the left and right wheel suspensions, where the left and right wheel suspensions are mounted directly to the sub-frame assembly.

By this first embodiment of the individual suspension arrangement according to the invention, a rear suspension is provided in which each wheel can move independently of the other. The wheel suspension is provided with an air bellows and a lifting bellows which further allows for a reduced extension in the longitudinal direction of the suspension arrangement. In this way, the suspension arrangement does not extend forwards or rearwards of the wheel, which e.g. allows for the use of a larger fuel tank. In the suspension, the left and right wheel suspensions are connected to each other with a sub-frame assembly which is fixed in position and does not move when the wheels spring. Preferably, the sub-frame assembly comprises two sub frames.

Each individual suspension is mounted to a sub-frame assembly which is fixed when the wheel springs. The sub-frame assembly is mounted to frame brackets, where one frame bracket is mounted on each side of the vehicle frame. The frame brackets are mounted only to the web of the main frame beams, and are mounted only in one mounting position. In this way, no loads acting on the wheel suspension will be transferred through the main frame beams but will be absorbed in the rear suspension arrangement. The lifting bellows acts on an extension of the lower wishbone bracket. Since each lifting bellows act on each individual wheel suspension, the sub-frame is fixed also when the wheels are raised. In this way, there will be no interference between the sub-frame and the propeller shaft. Further, the ground clearance of the vehicle may be improved.

In the method for mounting the rear suspension arrangement, a rear suspension assembly comprising the sub-frame assembly and the right and the left wheel suspensions is preassembled. The frame brackets are mounted to the web of the main frame beams, one on each side. Thereafter, the rear suspension assembly is docked to the frame brackets and is mounted to the frame brackets in four mounting positions, two spaced apart mounting positions on each frame bracket.

BRIEF DESCRIPTION OF DRAWINGS

The invention will be described in greater detail in the following, with reference to the attached drawings, where.

DETAILED DESCRIPTION

The embodiments of the invention with further developments described in the following are to be regarded only as examples and are in no way to limit the scope of the protection provided by the patent claims. The use of left and right refers to the position on the vehicle when seen in the driving direction of the vehicle. The same applies to upper and lower and also inner and outer. A longitudinal direction is the direction along the driving direction of the vehicle.

Figure 1:
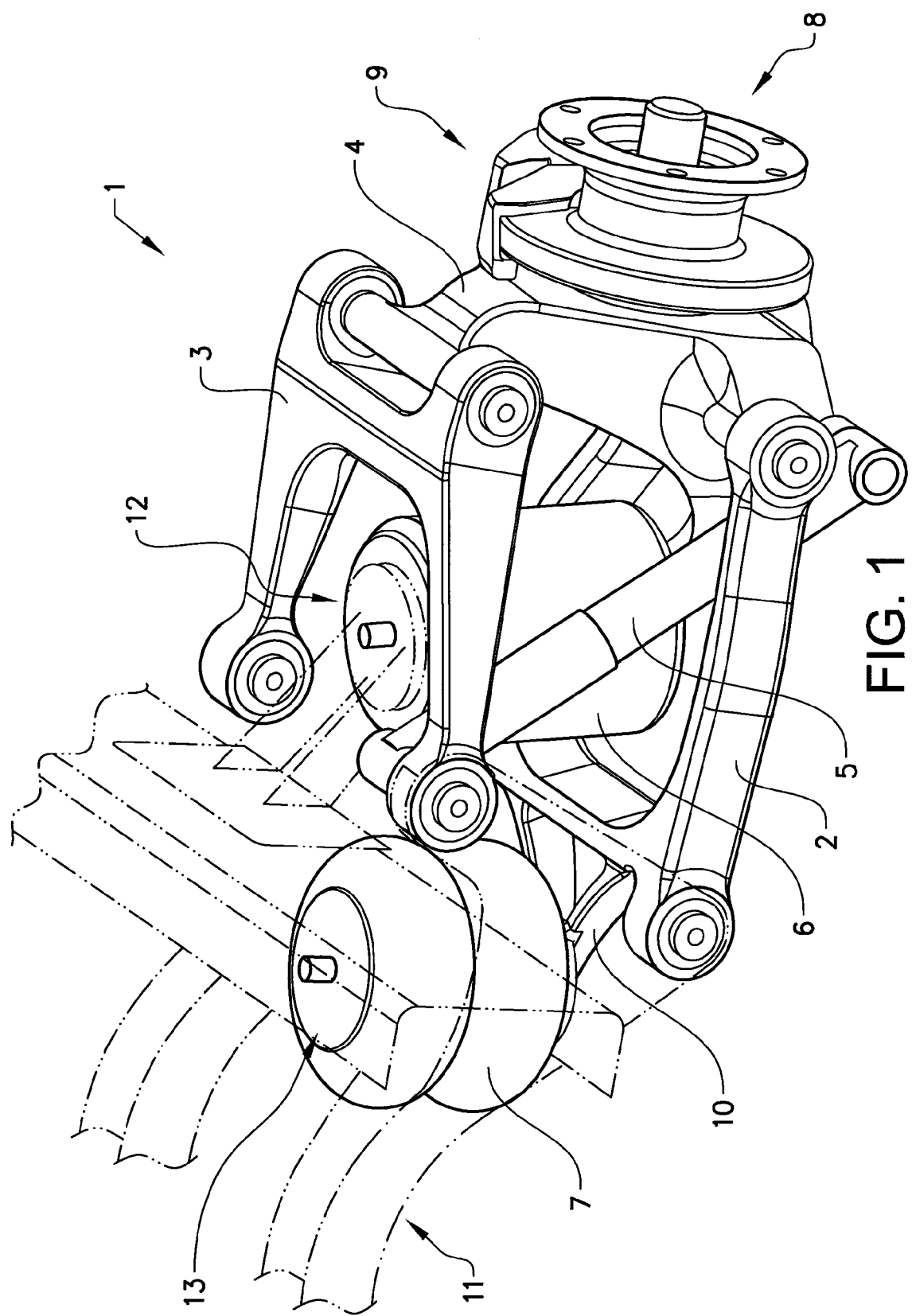
FIG. 1 shows a view of an individual suspension according to the invention.
Figure 2:
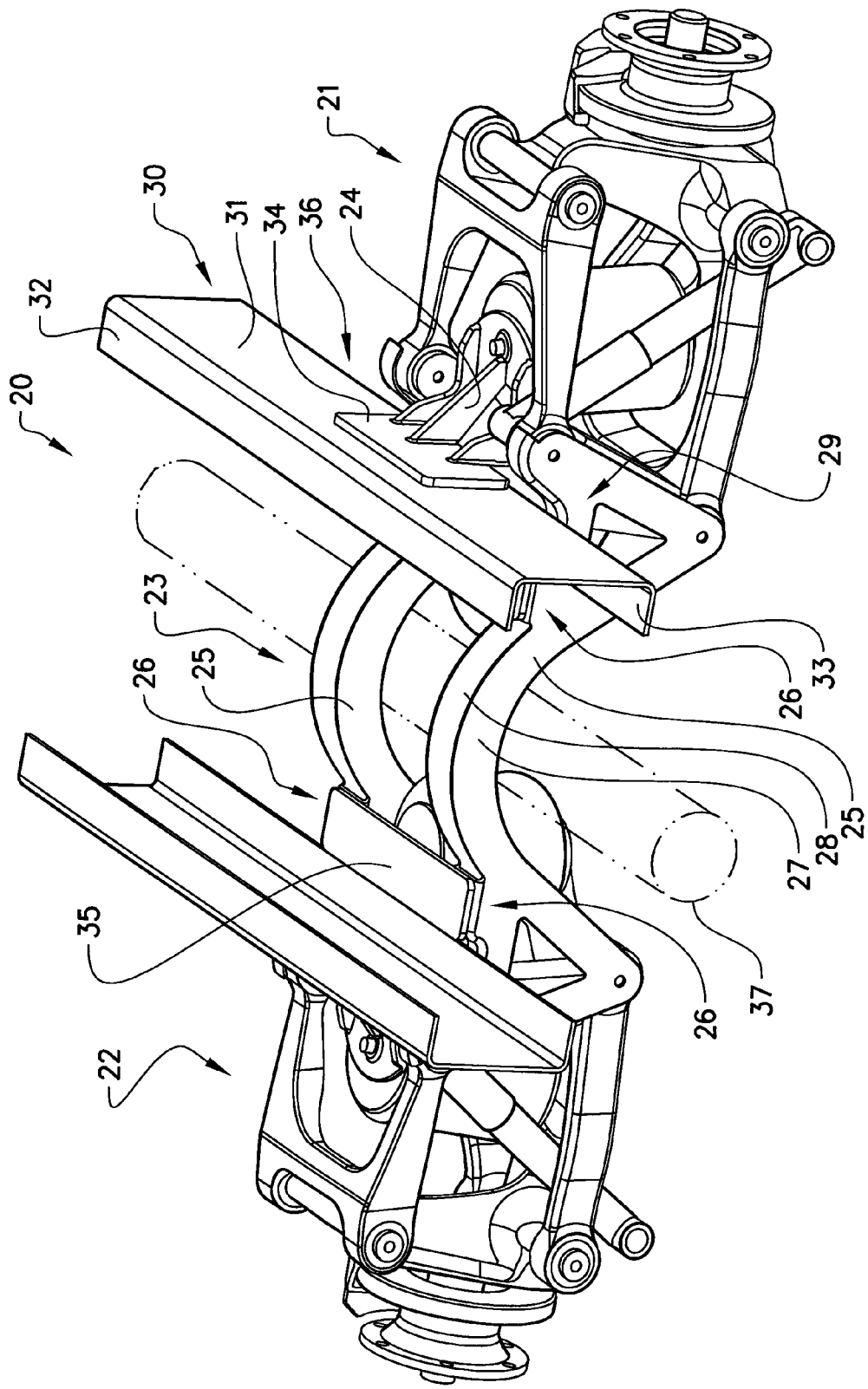
FIG. 2 shows a first embodiment of an individual suspension arrangement according to the invention.
Figure 3:
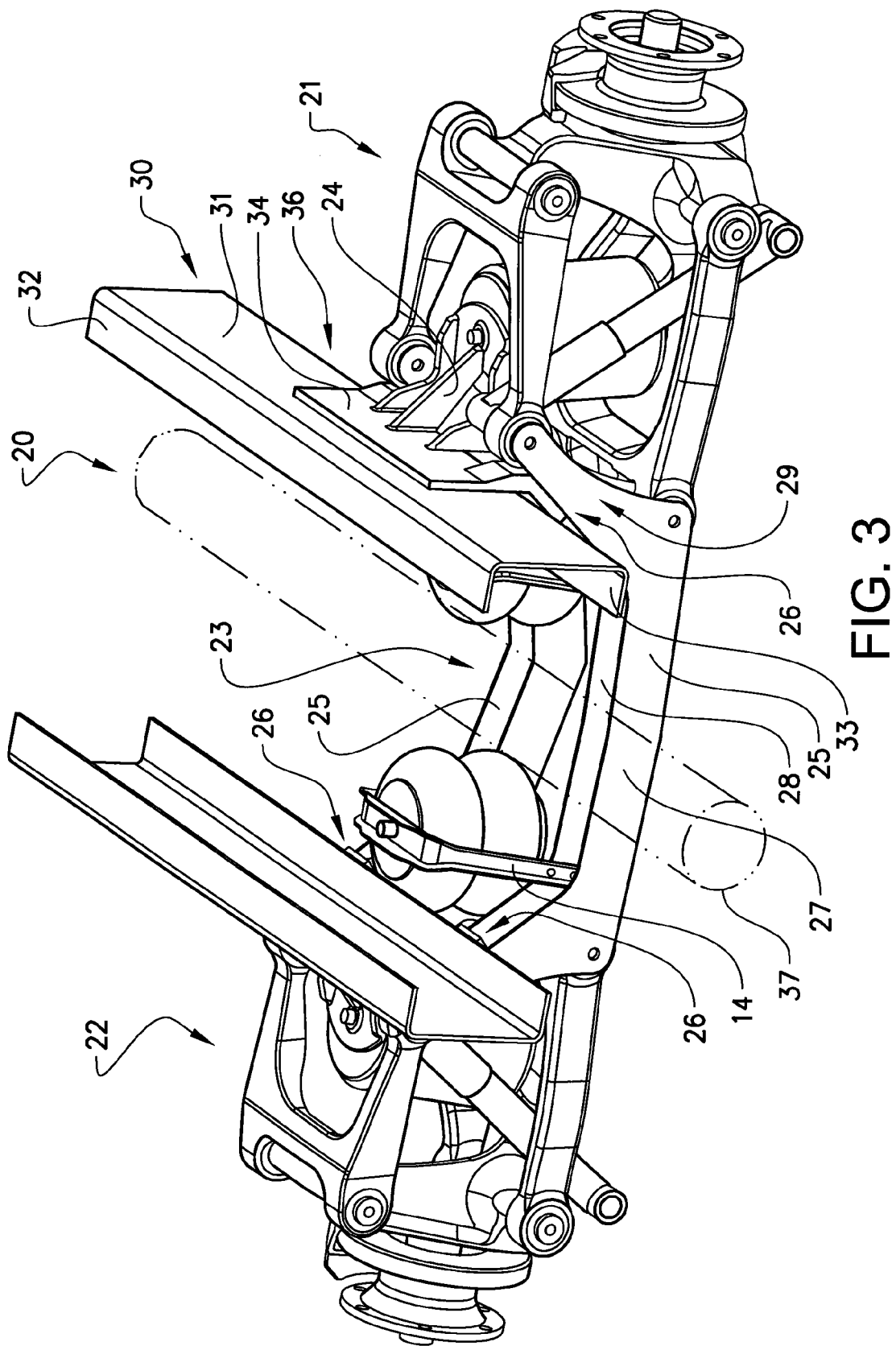
FIG. 3 shows a development of an individual suspension arrangement according to the invention.

FIG. 1 shows an individual suspension 1 according to the invention for a liftable rear axle of a vehicle, preferably a heavy vehicle such as a truck. FIGS. 2 and 3 show individual suspension arrangements where the individual suspension is used. The shown individual suspension is a left wheel suspension. The individual suspension 1 comprises a lower wishbone bracket 2 and an upper wishbone bracket 3. The lower wishbone bracket is mounted to the lower portion of a support assembly 11, here shown as a sub-frame assembly 23 comprising two sub-frames 25, with rubber bushings. The lower wishbone bracket 2 is further mounted to the lower portion of a king post 4 with rubber bushings. On the king post, a disc brake 9 and a hub 8 are arranged. The upper wishbone bracket 3 is mounted to the upper portion of the support assembly 11 and to the upper portion of the kingpost 4 with rubber bushings. Since the axle is of a non-steering type, the king post is provided with two attachments at the lower and upper portion.

By the use of two wishbone brackets, an individual wheel suspension as known from e.g. front wheel suspensions is obtained. The wishbone brackets resemble a parallelogram where the length of the upper and lower wishbone bracket gives the characteristics of the wheel angle inclination when the wheel springs. The wheel suspension further comprises an air bellows 6 which makes up the spring of the suspension, and a shock absorber 5. The lower part of the air bellows is mounted to the king post and the upper part of the air bellows bears on an upper air bellows support 12, which is preferably supplied on a frame bracket. The shock absorber is mounted between the king post and the upper wishbone bracket. The air bellows 6 is mounted in the wheel suspension such that it is positioned outside of a plane defined by the web 31 of the left main frame beam 30 of the vehicle. By positioning the air bellows outside of the frame, a More compact wheel suspension is provided.

The left wheel suspension is also provided with a lifting bellows 7. By using a lifting bellows, a liftable axle is obtained. The liftable axle may be either a pusher axle or a tag axle. Here, a pusher axle is used as an example of a liftable axle. The lifting bellows 7 is positioned inside a plane defined by the web of the main frame beam, and inside of the air bellows. With this position, the lifting bellows is well protected. The two bellows are thus arranged along the same axle between the wheel hubs. By positioning the lifting bellows in this way, a compact pusher wheel suspension is obtained, where both the air bellows and the lifting bellows can fit between the wheel and the propeller shaft. Further, neither the air bellows nor the lifting bellows extends forwards or rearwards of the wheel, which means that other components can be mounted in front of and close to the wheel. Such components may be e.g. a fuel tank, a storage box or a battery box. In conventional pusher installations, springs and brackets extend forwards of the wheel. The lifting bellows is arranged between an extension 10 of the lower wishbone bracket and an upper lifting bellows support 13, which may be comprised in a frame bracket. The upper lifting bellows support 13 may also be a support mounted to the support assembly 11, such as a U-link 14 mounted to the sub-frame 25.

In normal operation, the air bellows of the wheel suspension is inflated, acting as the spring of the wheel suspension. In this way, an individual air suspended wheel is provided. When the wheel is to be raised, the air bellows is deflated and the lifting bellows is inflated. This will push the lower wishbone extension 10 supporting the lifting bellows 7 down, and the outer end of the lower wishbone bracket will rise, which will lift the wheel from the ground.

FIG. 2 shows a first embodiment of an individual suspension arrangement 20 according to the invention for the use in a vehicle, preferably a heavy vehicle such as a truck. The individual suspension arrangement 20 comprises a left individual wheel suspension 21 and a right individual wheel suspension 22. The left wheel suspension and the right wheel suspension are similar, but mirror-inverted, and have the same functionality. Thus, only the left wheel suspension 21 is described in detail. The left and right wheel suspensions are hingedly attached to a sub-frame assembly 23 which provides fixed positions for the inner attachments of the wheel suspensions. In this way, an individual wheel suspension arrangement is provided, where no rigid axle member interconnects the wheels.

The sub-frame assembly 23 preferably consists of or comprises two sub-frames 25 which are spaced apart in order to improve the stiffness and rigidity of the individual suspension arrangement. In the shown example, each sub-frame 25 comprises two sub-frame elements 27, 28 made from pressed and cut steel sheet material. The two sub-frame elements may be identical or may be different, depending on the design. A sub-frame further comprises a sub-frame support bracket 29 which is positioned between the two sub-frame elements, close to the attachment positions for the upper and lower wishbones. The sub-frame support bracket helps to stabilize the sub-frame and will also make up the mounting positions 26 far the sub-frame when it is mounted to the frame bracket. It would also be possible to make a sub-frame in other materials, such as cast or forged steel.

The individual suspension arrangement further comprises frame brackets 24 to which the sub-frame assembly of the individual suspension arrangement is mourned. The main frame beam 30 is a U-beam and comprises a web 31, an upper flange 32 and a lower flange 33. The vertical frame bracket flange 34 is mounted only to the web of the main frame beam. The frame bracket is mounted with a plurality of fastening means such as screws and/or rivets. The fastening means will thus hold the frame bracket to the main frame in only one mounting position 36, where the mounting position extends over a large part of the vertical flange of the frame bracket. The horizontal flange 35 of the frame bracket is not in contact with the lower flange 33 of the main frame beam 30. In this way, the complete rear suspension arrangement will be mounted to the main frame of the vehicle in only two mounting positions, one on each side of the frame. The advantage of this is that forces, especially lateral forces, acting on the wheel suspensions will not be transferred to the frame of the vehicle, but will instead be transferred to the sub-frame assembly and will thus act only on the rear suspension arrangement. This will reduce the influences from the wheel suspensions on the frame of the vehicle and will reduce the flexing of the frame.

Further, the sub-frame assembly 23 of the individual suspension arrangement 20 is only mounted to the horizontal flanges 35 of the frame brackets 24. Each sub-frame 25 is mounted to a frame bracket in one mounting position 26. The bellows 6, 7 may also bear on the frame bracket. This means that all forces acting on the wheel suspensions will be transferred to the frame bracket and to the sub-frame assembly. Thus, the frame bracket will take up the forces but will not transfer them to the main frame. The impact on the fastening means which attaches the frame bracket to the web of the frame is thus reduced. In a conventional wheel suspension, two spaced apart brackets, a forward bracket and a rearward bracket, will attach the suspension to the main frame, which will transfer the forces to and through the main frame.

The sub-frame assembly 23 is in the shown example arc-shaped such that it extends above the propeller shaft 37 of the vehicle. In this way, there is room for the propeller shaft to move up and down when the driving wheels spring due to an uneven road or the like. In this way, the ground clearance of the vehicle is improved, which is advantageous for vehicles travelling on rough roads. This arrangement is especially suited for a pusher axle which is arranged in front of the drive wheels on a vehicle having more than one rear axle. Since the individual suspension does not extend forwards more than the wheel, it is possible to mount other components close to the wheels of the pusher axle, which is the first rear axle. Such components may be a fuel tank, a battery box or another storage box.

FIG. 3 shows a development of the individual suspension arrangement 20 according to the invention. The individual suspension arrangement shown in FIG. 3 resembles the one shown in FIG. 2, with the only difference being the design of the sub-frame assembly 23 and the frame bracket 24. In this example, the sub-frame is designed such that it can extend under a propeller shaft of a vehicle, when the arrangement is used as a pusher axle. Such an arrangement may be suitable for highway trucks which may not require a high ground clearance. Further, the arrangement may also be used for a tag axle, where the sub-frame assembly may be designed to the required ground clearance, since there is no propeller shaft to adapt to when the axel is arranged behind the drive axle of the vehicle.

In this example, the frame bracket 24 comprises a vertical flange 34 which is mounted to the web 31 of the main frame beam in one mounting position 36. The frame bracket further comprises an angled lower flange to which the sub-frame support bracket and thus the sub-frame assembly is mounted. As described above, each sub-frame assembly is only mounted to each frame bracket in one mounting position. The lifting bellows 7 does not bear on the frame bracket in is example, since the lower flange does not extend inwards such that it can provide a bearing surface for the lifting bellows. Instead, the lifting bellows 7 is supported by a U-shaped link member 14 which is attached to the sub-frame assembly, and more specifically to both sub-frames 25. In this way, the lifting bellows can apply a force between the lower wishbone bracket extension and the sub-frame assembly that will lift the wheels of the liftable axle.

The individual suspension arrangement is mounted to the vehicle in the following way. The left and right wheel suspensions are preassembled at a first assembly site. Thereafter, the wheel suspensions are mounted to the sub-frame assembly. The wheel suspensions are held to the sub-frame assembly by rubber bushings and screws. In this way, an individual suspension arrangement comprising the sub-frame and the left and right wheel suspensions is obtained. The air bellows are mounted to the king posts and the lifting bellows are mounted to the extensions of the lower wishbone brackets.

The frame brackets are mounted to the web of the main frame beams of the vehicle in the normal production flow. When the individual suspension arrangement is to be mounted, the preassembled individual suspension arrangement is docked to the frame brackets from below at a docking station and is mounted to the frame brackets at the sub-frame mounting positions 26 with e.g. screws. This allows the rear suspension arrangement to be mounted to the vehicle in an easy and quick way. Further, the rear suspension assembly can be preassembled in a reliable way.

The invention is not to be regarded as being limited to the embodiments described above, a number of additional variants and modifications being possible within the scope of the subsequent patent claims.

REFERENCE SIGNS

1: Individual rear suspension
2: Lower wishbone bracket
3: Upper wishbone bracket
4: King post
5: Shock absorber
6: Air bellows
7: Lifting bellows
8: Hub
9: Disc brake 10: Lower wishbone bracket tension
11: Support assembly
12: Upper air bellows support
13: Upper lifting bellows support
14: U-link
20: Individual suspension arrangement
21: Left wheel suspension
22: Right wheel suspension
23: Sub-frame assembly
24: Frame bracket
25: Sub-frame
26: Sub-frame mounting position
27: Sub-frame element
28: Sub-frame element
29: Sub-frame support bracket
30: Main frame beam
31: Main frame beam web
32: Upper beam flange
33: Lower beam flange
34: Vertical frame bracket flange
35: Horizontal frame bracket flange
36: Frame bracket mounting position
37: Propeller shaft

The invention claimed is:

1. Independent suspension for a rear axle of a vehicle, comprising a lower wishbone and an upper wishbone, where the lower wishbone and the upper wishbone are hingedly suspended to a support assembly and to a king post, wherein the suspension further comprises an air bellows and a lifting bellows, wherein the air bellows is mounted to the king post and arranged entirely outside of a plane defined by a web of a main frame beam, and in that the lifting bellows acts on an extension of the lower wishbone and is arranged on the inside of the plane defined by the web of the main frame beam.

2. Suspension according to claim 1, wherein the air bellows is arranged between the lower wishbone and an upper air bellows support and that the lifting bellows is arranged between the extension of the lower wishbone and an upper lifting bellows support.

3. Suspension according to claim 2, wherein the upper air bellows support is a frame bracket attached to the web of the main frame beam.

4. Suspension according to claim 2, wherein the upper lifting bellows support is a frame bracket attached to the web of the main frame beam.

5. Suspension according to claim 2, wherein the upper lifting bellows support is a U-shaped link member mounted to the support assembly.

6. Independent suspension arrangement for a rear axle of a vehicle, comprising a left wheel suspension and a right wheel suspension according to claim 1, wherein the arrangement further comprises at least one sub-frame assembly extending between the left and right wheel suspensions, where the left and right wheel suspensions are mounted directly to the sub-frame assembly.

7. Arrangement according to claim 6, wherein the arrangement further comprises a frame bracket mounted to the sub-frame assembly at each wheel suspension, where the frame bracket is adapted to be mounted only to the web of the main frame beam.

8. Arrangement according to claim 7, wherein an upper air bellows support and an upper lifting bellows support are comprised in the frame bracket.

9. Arrangement according to any of claims 6, wherein the sub-frame assembly comprises two sub-frames extending between the left and right wheel suspensions and are mounted on each side of the lifting bellows in a longitudinal direction of the vehicle.

10. Arrangement according to claim 9, wherein each sub-frame is mounted to each frame bracket in only one mounting position.

11. Arrangement according to claim 9, wherein each sub-frame comprises two sub-frame elements mounted in parallel to each other.

12. Arrangement according to claim 11, wherein each sub-frame comprises a sub-frame support bracket enclosed between the sub-frame elements.

13. Vehicle, comprising at least one rear suspension arrangement according to claim 6.

14. Vehicle according to claim 13, wherein the sub-frame assembly extends above a propeller shaft of the vehicle.

15. Vehicle according to claim 13, wherein the sub-frame assembly extends below a propeller shaft of the vehicle.

* * * * *